United States Patent [19]

Amann et al.

[11] 3,881,011
[45] Apr. 29, 1975

[54] ANTICONVULSANT

[75] Inventors: August Amann, Horst Koenig, both of Ludwigshafen; Peter Thieme, Ruchheim; Hubert Giertz, Limburgerhof; Rolf Kretzschmar, Uetersen, all of Germany

[73] Assignee: BASF Aktiengesellschaft, Ludwigshafen/Rhine, Germany

[22] Filed: Feb. 11, 1974

[21] Appl. No.: 441,335

[30] Foreign Application Priority Data
Feb. 10, 1973 Germany.......................2306543

[52] U.S. Cl. ................................. 424/270
[51] Int. Cl. ............................. A61k 27/00
[58] Field of Search ..................... 424/270

[56] References Cited
OTHER PUBLICATIONS
Potts et al., Chemical Comm. (1968), p. 672.

Grashey et al., Tetrahedron Letters, (1968), p. 5881.

J. Pharm. Sci., (1967), Vol. 56, p. 165.

*Primary Examiner*—Stanley J. Friedman
*Attorney, Agent, or Firm*—Johnston, Keil, Thompson & Shurtleff

[57] ABSTRACT

A therapeutic agent containing as active ingredient anhydro-2-mercapto-4-methyl-5-phenyl-1,3,4-thiadiazolium hydroxide and/or anhydro-2-mercapto-4-methyl-5-(p-chlorophenyl)-1,3,4-thiadiazolium hydroxide. The agent may be used as an anticonvulsant for the treatment of psychomotor convulsions, epilepsy, grand mal, petit mal and the like.

9 Claims, No Drawings

ANTICONVULSANT

This invention relates to a novel anticonvulsant containing anhydro-2-mercapto-4-methyl-5-phenyl-1,3,4-thiadiazolium hydroxide and/or anhydro-2-mercapto-4-methyl-5-(p-chlorophenyl)-1,3,4-thiadiazolium hydroxide.

These compounds are described by K. T. Potts and C. Sapino in Chemical Communications 1968, p. 672, and the compound containing the unsubstituted phenyl radical is also described by R. Grashey, M. Baumann and W. -D. Lubos in Tetrahedron Letters, 1968, pp. 5881 et seq. However, their anticonvulsive activity is completely unexpected.

The isomeric anhydro-2-mercapto-4-phenyl-5-methyl-1,3,4-thiadiazolium hydroxide is described in J. Pharm. Sci., 1967, Vol. 56, p. 165, as having merely bacteriostatic or bactericidal properties against microorganisms and slight hypotensive properties. This paper also states that the 5-alkyl compounds produce spasms when administered to rats in relatively high doses.

The compound anhydro-2-mercapto-4-methyl-5-phenyl-1,3,4-thiadiazolium hydroxide and the derivative on which the phenyl ring is substituted by chlorine in the para position are distinguished by excellent anticonvulsive activity. The existence of this property in these compounds is particularly advantageous because the other neuropharmacological properties such as sedation and prolongation of the hexobarbital sleeping period only occur at very high doses and consequently the therapeutic index in animal tests is extremely high. Thus the $LD_{50}$ in the mouse is more than 2,000 mg/kg administered orally, whilst the $ED_{50}$ affording protection from minimum and maximum pentatrazole shocks is only 7.5 and 8 mg/kg respectively. This gives a safety index of more than 135 and 125 respectively. The only other drug to achieve a similar safety index against pentetrazole shock, namely 114, is diazepam. By comparison, the safety index for minimum and maximum pentetrazole shock in phenobarbital and trimethadione is less than 5. By the safety index is meant the ratio of the neurotoxic $ED_{50}$ to the $ED_{50}$ determined in convulsion tests.

It should be pointed out that it is not possible to effect precise determination of the neurotoxic $ED_{50}$ of anhydro-2-mercapto-4-methyl-5-phenyl-1,3,4-thiadiazolium hydroxide by the method described by Swinyard et al in J. Pharm. Exper. Ther. 106, 319 (1952), since no signs of neurotoxic activity are found in the mouse when this compound is administered orally in doses of up to 1,000 mg/kg.

Similar results are found in the mouse for minimum and maximum electric shocks as for corresponding pentetrazole shocks. The safety index for anhydro-2-mercapto-4-methyl-5-phenyl-1,3,4-thiadiazolium hydroxide is even higher for maximum electric shocks than for pentetrazole spasms, namely greater than 250, whereas it is 9.5 for diazepam, 6.4 for phenobarbital and 2.5 for trimethadione.

Another advantage over the above substances cited for comparison is that the active ingredients of the invention show only very slight sedative activity. For example, narcosis effected in the mouse with 64 mg/kg of hexabarbital (administered intravenously) is only slightly influenced at low doses of the active ingredients of the invention and a dose of as much as about 250 mg/kg (administered orally) is required to double said narcosis. In a comparative test under similar conditions, the hexabarbital narcosis is doubled at a dose of diazepam of as low as 1.36 mg/kg and a dose of trimethadione of 50.0 mg/kg.

The following Table lists results of tests carried out on the mouse using anhydro-2-mercapto-4-methyl-5-phenyl-1,3,4-thiadiazonium hydroxide and, for comparison, conventional anticonvulsants.

TABLE

Anticonvulsive action of anhydro-2-mercapto-4-methyl-5-phenyl-1,3,4-thiadiazolium hydroxide (substance 1) in the mouse when administered orally, compared with the action of diazepam, phenobarbital and trimethadione and also phenytoin.

| | $LD_{50}$ (mg/kg) | Neurotoxic $ED_{50}$ (Swinyard et al 1952 - see text) (mg/kg) | MES* $ED_{50}$ (mg/kg) | SI** | Min. pentetrazole shock $ED_{50}$ (mg/kg) | SI*** | Max. pentetrazole Shock $ED_{50}$ (mg/kg) | SI**** |
|---|---|---|---|---|---|---|---|---|
| diazepam | 650 | 57 | 6.0 | 9.5 | 0.5 | 114 | 0.5 | 114 |
| phenobarbital | 320 | 70 | 11.0 | 6.4 | 30.0 | 2.3 | 21.5 | 3.3 |
| trimethadione | 1000 | 1150 | 450 | 2.5 | 240 | 4.8 | 260 | 4.4 |
| phenytoin | | 84α | 8.0 | 10.5 | | | | |

*maximum electric shock
**safety index neurotoxic $ED_{50}$ divided by MES $ED_{50}$
***safety index neurotoxic $ED_{50}$ divided by minimum pentetrazole $ED_{50}$
****safety index neurotoxic $ED_{50}$ divided by maximum pentetrazole $ED_{50}$
α determined according to Swinyard et al. J. Pharm. Exp. Ther. 151, 369, 1966.

The same degree of superiority of the compound used in the present invention over the above comparative substances may be seen in the rat, for example as regards pentetrazole spasms.

Similar biological activity may be observed when using the p-chlorophenyl compound.

Thus the invention provides an anticonvulsant having far greater selectivity and a much better therapeutic index than prior art anticonvulsants. The compounds used in the invention are also superior to the prior art anticonvulsants, including diazepam, in respect of the therapeutic range, i.e. the difference between the doses having neurotoxic side-effects.

Anhydro-2-mercapto-4-methyl-5-phenyl-1,3,4-thiadiazolium hydroxide and the chlorophenyl derivative are particularly suitable for the treatment and prophylaxis of psychomotor convulsions, epilepsy, grand mal, petit mal and electric shocks.

Using a suitable inert excipient or diluent and conventional pharmaceutical auxiliaries, appropriate pharmaceutical compositions in unit dose form may be prepared in conventional manner. The amount of active ingredient contained therein is selected such that one or more units will normally be required for a single therapeutic dose.

A preferred pharmaceutical composition is one suitable for oral administration. Examples of such compositions are tablets, dragees and capsules, which may be prepared in known manner.

The compositions usually consist of the active ingredient in admixture with an excipient or diluted by an excipient or encapsulated by a carrier in the form of a capsule or some other container acting as excipient, which may serve as a mediator, a flavoring agent or a diluent for the active ingredient. The excipient may be a solid, semi-solid or liquid substance.

Suitable excipients which may be used are for example lactose, dextrose, sucrose, sorbitol, mannitol, starch, gum acacia, coconut butter, cocoa butter, alginates, tragacanth, gelatine, invert sugar syrup, methyl cellulose, polyoxyethylenesorbitan monolaurate, methylhydroxy benzoate and propylhydroxy benzoate. In the preparation of tablets a lubricant may be added to prevent lodging of the powdered ingredients in the tablet molds and plungers. Suitable lubricants are for example talcum and aluminum, magnesium and calcium stearates.

Anhydro-2-mercapto-4-methyl-5-phenyl-1,3,4-thiadiazolium hydroxide having the following chemical structure

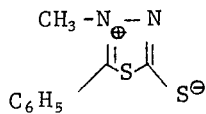

may be manufactured industrially by, for example, the following process.

1. Sodium dithiobenzoate

To a mixture of 64 g (2 moles) of ground sulfur in 500 ml of absolute methanol and 396 g of 30% sodium methoxide solution there are added dropwise, at room temperature, 126.6 g (1.0 mole) of benzyl chloride over 1 hour. The mixture turns red and heats up to the boil. It is then heated at the boil under reflux for 16 hours. The reaction mixture is cooled and the sodium chloride formed is filtered off and washed with methanol, and the mother liquid and filtrate are evaporated. There are obtained 251.9 g of sodium dithiobenzoate as a red oil.

2. 2-Mercapto-S-thiobenzoyl acetic acid

The sodium dithiobenzoate from Example 1 is dissolved in 600 ml of water, cooled to 0°C and mixed with 116.5 g (1.5 moles) of sodium chloroacetate. During this addition the temperature should not exceed 5°C. The mixture is stirred for 2 hours in an ice bath and is then maintained at 0°C for 48 hours. The solution is shaken once with 200 ml of ether and then acidified with concentrated aqueous hydrochloric acid. A deep red precipitate is formed which is filtered off and dried. The yield of 2-mercapto-S-thiobenzoyl acetic acid is 117.2 g (55% of theory), m.p. 117°–119°C.

3. 1-Methyl-thiobenzhydrazide 117.2 g. of 2-mercapto-S-thiobenzoyl acetic acid from Example 2 are dissolved in 552 ml of 1N caustic soda solution and 27.6 g (0.6 mole) of methylhydrazine in 150 ml of water are added dropwise thereto at 0°C. Stirring is continued for a further hour and the precipitate is filtered off. There are obtained 86.7 g (95% of theory) of 1-methyl-1-thiobenzhydrazide, m.p. 86°–87°C.

4. Anhydro-2-mercapto-4-methyl-5-phenyl-1,3,4-thiodiazolium hydroxide 25 g of 1-methyl-1-thiobenzhydrazide are dissolved in 200 ml of absolute acetonitrile and an excess of carbon disulfide (about) 30 ml) is added and the mixture is heated at the boil under reflux for 10 hours, during which period hydrogen sulfide is generated, a washing tower being provided for its removal. On cooling, 26.1 g (83% of theory) of anhydro-2-mercapto-4-methyl-5-phenyl-1,3,4-thiadiazolium hydroxide, m.p. 219°–221°C, are precipitated.

Anhydro-2-mercapto-4-methyl-5-(p-chlorophenyl)-1,3,4-thiadiazolium hydroxide melting at 201°–202°C is similarly prepared from 1-methyl-(p-chlorothiobenz) hydrazide, m.p. 113°–116°C The above Examples are described in the literature. For example, Example 1 is described in German Patent 1,274,121, Examples 2 and 3 are described by K. A. Jensen et al. in Acta Chem. Scand. 1109 (1961) and Example 4 is described in the reference given on page 1.

As was pointed out above, suitable pharmaceutical compositions include tablets (coated or uncoated), capsules and dragees. It is preferred that these compositions contain single doses of the active ingredient or ingredients of from about 10 to 100 mg. Preferably, daily doses of the active ingredient or ingredients are from about 60 to 600 mg. The following is an example of a suitable tablet:

| | | |
|---|---|---|
| 1. | anhydro-2-mercapto-4-methyl-5-phenyl-1,3,4-thiadiazolium hydroxide | 50 mg |
| 2. | polyvinylpyrrolidone (mean molecular weight 25,000) | 20 mg |
| 3. | polyethylene glycol (mean molecular weight 4,000) | 14 mg |
| 4. | hydroxypropylmethylcellulose | 40 mg |
| 5. | talc | 4 mg |
| 6. | magnesium stearate | 2 mg |
| | | 130 mg |

Anhydro-2-mercapto-4-methyl-5-phenyl-1,3,4-thiadiazolium hydroxide is moistened with a 10 percent strength aqueous solution of polyvinylpyrrolidone, forced through a sieve of 1.0 mm mesh width and dried at 50° celsius. The granules obtained are mixed with polyethylene glycol (mean molecular weight 4,000), hydroxypropylmethylcellulose, talc and magnesium stearate and pressed to give tablets each weighing 130 mg.

We claim:

1. A pharmaceutical preparation in dosage unit form adapted for oral administration to obtain an anticonvulsant effect, comprising, per dosage unit, an anticonvulsant-effective non-toxic amount within the range from about 10 to 100 milligrams of a compound selected from the group consisting of anhydro-2-mercapto-4-methyl-5-phenyl-1,3,4-thiadiazolium hydroxide and anhydro-2-mercapto-4-methyl-5-(p-chlorophenyl)-1,3,4-thiadiazolium hydroxide, and conventional inert excipients and auxiliaries.

2. A pharmaceutical preparation as set forth in claim 1 wherein said excipients are selected from the group consisting of lactose, dextrose, sucrose, sorbitol, mannitol, starch, gum acacia, coconut butter, cocoa butter, alginates, tragacanth, gelatine, invert sugar syrup, methyl cellulose, polyoxyethylenesorbitan monolaurate, methylhydroxy benzoate, propylhydroxy benzoate, polyvinylpyrrolidone having a mean molecular weight of 25,000 and polyethylene glycol having a mean molecular weight of 4,000.

3. A pharmaceutical preparation as set forth in claim 1 wherein said auxiliaries are selected from the group consisting of talcum, aluminum stearate, magnesium stearate and calcium stearate.

4. A method for the treatment and prophylaxis of psychomotor convulsions, epilepsy, grand mal, petit mal and electric shocks which comprises administering orally to a mouse a pharmaceutically effective amount of a compound selected from the group consisting of anhydro-2-mercapto-4-methyl-5-phenyl-1,3,4-thiadiazolium hydroxide and anhydro-2-mercapto-4-methyl-5-(p-chlorophenyl)-1,3,4-thiadiazolium hydroxide.

5. A method as set forth in claim 4 wherein a daily dose of said compound is within the range from about 60 to 600 milligrams.

6. A method as set forth in claim 4 wherein said compound is combined with conventional inert excipients and auxiliaries.

7. A method as set forth in claim 6 wherein said excipients are selected from the group consisting of lactose, dextrose, sucrose, sorbitol, mannitol, starch, gum acacia, coconut butter, cocoa butter, alginates, tragacanth, gelatine, invert sugar syrup, methyl cellulose, polyoxyethylenesorbitan monolaurate, methylhydroxy benzoate, propylhydroxy benzoate, polyvinylpyrrolidone having a mean molecular weight of 25,000 and polyethylene glycol having a means molecular weight of 4,000.

8. A method as set forth in claim 6 wherein said auxiliaries are selected from the group consisting of talcum, aluminum stearate, magnesium stearate and calcium stearate.

9. A method as set forth in claim 6 wherein said combination is in the form of a tablet.

* * * * *

UNITED STATES PATENT AND TRADEMARK OFFICE
CERTIFICATE OF CORRECTION

PATENT NO. : 3,881,011
DATED : April 29, 1975
INVENTOR(S) : August Amann, et al

It is certified that error appears in the above-identified patent and that said Letters Patent are hereby corrected as shown below:

In the Table in Columns 1 and 2, substitute the column entries between the second and third horizontal lines as per attached copy:

Signed and Sealed this first Day of June 1976

[SEAL]

Attest:

RUTH C. MASON
Attesting Officer

C. MARSHALL DANN
Commissioner of Patents and Trademarks

TABLE

Anticonvulsive action of anhydro-2-mercapto-4-methyl-5-phenyl-1,3,4-thiadiazolium hydroxide (substance 1) in the mouse when administered orally, compared with the action of diazepam, phenobarbital and trimethadione and also phenytoin.

| | $LD_{50}$ | Neurotoxic $ED_{50}$ (Swinyard et al 1952 - see text) | MES * $ED_{50}$ | SI ** | Min. pentetrazole shock $ED_{50}$ | SI *** | Max. pentetrazole Shock $ED_{50}$ | SI **** |
|---|---|---|---|---|---|---|---|---|
| | (mg/kg) | (mg/kg) | (mg/kg) | | (mg/kg) | | (mg/kg) | |
| substance 1 | >2000 | >1000 | 4.0 | >250 | 7.5 | >135 | 8.0 | >125 |
| diazepam | 650 | 57 | 6.0 | 9.5 | 0.5 | 114 | 0.5 | 114 |
| phenobarbital | 320 | 70 | 11.0 | 6.4 | 30.0 | 2.3 | 21.5 | 3.3 |
| trimethadione | 1000 | 1150 | 450 | 2.5 | 240 | 4.8 | 260 | 4.4 |
| phenytoin | | 84 ᵈ | 8.0 | 10.5 | | | | |

\* maximum electric shock
\*\* safety index neurotoxic $ED_{50}$ divided by MES $ED_{50}$
\*\*\* " " " " " " " minimum pentetrazole $ED_{50}$
\*\*\*\* " " " " " " " maximum " "

ᵈ determined according to Swinyard et al, J. Pharm. Exp. Ther. 151, 369, 1966.